Nov. 24, 1953   G. E. SORENSEN   2,660,421
SPEED GOVERNOR
Filed May 13, 1949
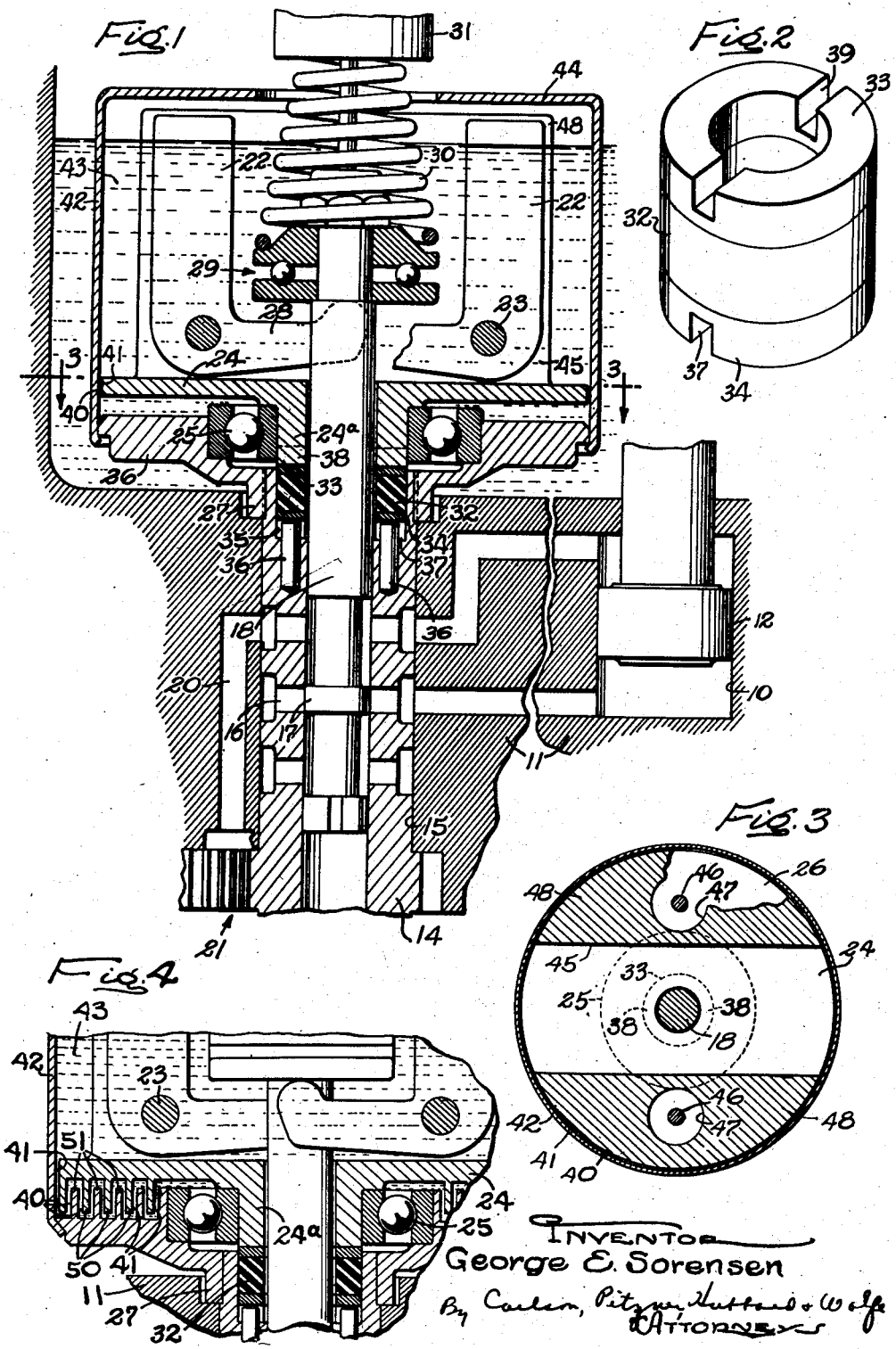
INVENTOR
George E. Sorensen Patented Nov. 24, 1953

2,660,421

UNITED STATES PATENT OFFICE 2,660,421

SPEED GOVERNOR

George E. Sorensen, Fairfield, Conn., assignor to Woodward Governor Company, Rockford, Ill., a corporation of Illinois Application May 13, 1949, Serial No. 93,055

8 Claims. (Cl. 264—2)

1

This invention relates to speed regulating governors, particularly those of the centrifugal type, and the primary object is to provide a governor having a novel fluid actuated means for damping out oscillations caused by roughness in the mechanical drive connection by which the centrifugal device of the governor is driven from the prime mover controlled thereby.

A more detailed object is to drive the speed responsive device of the governor through a resilient coupling angularly yieldable relative to the drive member and to provide a novel fluid dampener having coacting surfaces respectively rotatable with the speed responsive device and the drive member and immersed in fluid in a container which rotates with the drive member.

The invention also resides in the novel manner of deriving the damping force and of applying the same effectually.

Other objects and advantages of the invention will become apparent from the following detailed description taken in connection with the accompanying drawing, in which:

Figure 1 is a fragmentary cross-sectional view of a hydraulic governor embodying the present invention.

Fig. 2 is a perspective view of a part of the governor drive connection.

Fig. 3 is a section taken on the line 3—3 of Fig. 1.

Fig. 4 is a fragmentary view similar to Fig. 1 showing a modification.

In the drawing, the invention is shown incorporated in a governor for controlling the flow of pressure fluid to the cylinder 10 of a servo actuator which, together with the operating parts of the governor, is mounted in a hollow casing 11 adapted to be mounted on the prime mover for connection of the spring loaded servo piston 12 with the throttle or other means by which the prime mover speed is regulated.

The drive to the governor is through shafts and gearing (not shown) and terminates in a driving connection with the lower end of the drive member of the governor. The latter is in the form of a sleeve 14 projecting through the bottom of the governor casing and journaled in a bore 15 therein. Ports 16 in the sleeve cooperate with a land 17 on a plunger 18 to form a sensitive control device in the form of a valve by which pressure fluid is allowed to flow to or from the servo cylinder 10 through a connecting passage.

When the plunger is raised from the position shown in Fig. 1, fluid drains from the cylinder down through the valve and the drive sleeve 14. When the land 17 is lowered, fluid under pressure in a passage 20 is allowed to flow into the cylinder 10. Fluid maintained under substantially constant pressure by an automatic relief valve (not shown) is supplied to the passage 20 by a gear pump 21 having one gear integral with the shaft 14 below the control valve.

The valve plunger projects from the upper end of the sleeve 14 and is actuated in accordance with speed changes detected by a speed responsive device which in this instance includes flyballs 22 upstanding from pivots 23 on a ballhead 24. The latter is concentric with the sleeve 14, and its depending hub 24$^a$ is supported by a ball thrust bearing 25 supported in a disk 26 whose hub 27 is splined or otherwise made rigid with the upper end of the drive sleeve 14.

Horizontal arms 28 of the flyballs bear upwardly against the lower race of a ball bearing 29 whose upper race supports the valve plunger 18 through a shoulder thereon. A speeder spring 30 acts in compression against the upper bearing race and urges the plunger downwardly until the centrifugal force acting on the flyballs is balanced. The upper end of the spring bears against an abutment 31 which may be adjusted to vary the speed setting of the governor.

For a purpose to appear later, the drive from the sleeve 14 to the ballhead 24 is through a torque transmitting connection which is angularly yieldable so as to permit some degree of angular displacement of the ballhead relative to the drive sleeve in response to instantaneous variations in the speed of the sleeve. Herein, this resilient coupling is formed by a molded solid walled sleeve 32 of flexible rubber material having rings 33 and 34 of metal vulcanized or otherwise rigidly secured to its opposite ends. This rubber sleeve is disposed within a central recess 35 in the upper end of the drive sleeve and encircles the upper end of the valve plunger with ample clearance. Pins 36 on the sleeve project into downwardly opening recesses 37 in the ring 34 thereby coupling the lower end of the rubber sleeve to the drive sleeve. In a similar way, lugs 38 on the ballhead hub 24$^a$ project into slots 39 in the ring 33. Twisting of the coupling element in response to sudden and abnormal speed changes of the drive sleeve 14 is limited positively by the engagement of pins 46 (Fig. 3) upstanding from the disk 26 with the side walls of holes 47 in the bottom of the ballhead.

The drive sleeve 14, because it is driven from the prime mover through shafts, gearing, couplings, etc., usually does not turn smoothly but is forced to oscillate intermittently or continuously due to transient conditions, play and inaccuracies in the driving connections, explosive pulsations, etc. As a result of such forced oscillation, the instantaneous speed of the sleeve departs from the average speed of the prime mover, the amplitude of the transmitted oscillations frequently exceeding the band of insensitivity of the governor. Such false speed changes thus cause rapid variation of the servo position and the fuel supply with consequent improper combustion and lowered efficiency as well as accelerated wear of the prime mover.

The present invention aims to minimize the detrimental effect of the forced oscillations transmitted to the ballhead system by deriving a damping force not involving mechanical or rubbing friction in response to relative angular displacement between the ballhead and the drive sleeve 14 and applying this drag to the ballhead so that it is utilized to damp the ballhead oscillations. Generally stated, the damping force may be derived in various ways by the coaction of surfaces respectively rotatable with the drive member 14 and with the speed responsive device and immersed in a body of fluid. Thus, the damping force may, as illustrated herein, be a viscous drag produced by the action of a viscous fluid such as light lubricating oil on two opposed concentric surfaces 40 and 41 spaced closely adjacent each other and respectively rotating with the ballhead and the drive sleeve. The surface 40 comprises the outer periphery of the ballhead. The other surface is the inner wall of a cylinder 42 pressed onto the disk 26 and cooperating therewith to form a cup adapted to contain a body 43 of lubricating fluid or oil and having a flange 44 inturned at its upper end above the flyballs to hold the oil in the rotating cup. The governor casing surrounding the cup is also filled with oil. To avoid detracting from the sensitivity of the flyballs in detecting speed changes, the flyballs move with only small clearance in radial slots 45 formed between two lugs 48 upstanding from the ballhead on opposite sides of the flyballs and extending upwardly and outwardly beyond the top and outer edges of the flyballs.

The surfaces 40 and 41 are, it will be observed, disposed at relatively large radii so that by spacing them relatively close together, preferably on the order of .010 of an inch, a viscous drag of substantial magnitude will be derived from the relative angular oscillation between the cup and the ballhead, such drag being applied to the ballhead effectually to damp the oscillation thereof. As a result, the flyballs respond more nearly to the average speed of the prime mover and are substantially unaffected by changes in the instantaneous speed of the drive sleeve 14. By driving the oil cup positively and locating the flyballs in the slots 45, the inertia of the rotating oil body is not imposed on the flyball system or the flexible drive coupling.

If desired, the viscous dampening effect above described may be supplemented by constructing the flexible coupling element 32 so that it possesses internal damping characteristics. Such characteristics are possessed by certain materials, particularly rubber compounds which are relatively elastic but which at the same time are sluggish in returning to normal shape. Oil resisting rubber materials manufactured by Ideal Roller And Manufacturing Company of Chicago, Illinois, and known as LD compounds have been found suitable since they possess a so-called amplification ratio of less than seven. LD-74, for example, has an amplification ratio of only four and a modulus of elasticity in shear of 10 pounds per square inch. The length, over-all diameter, and wall thickness of the sleeve 32, the polar moment of inertia of the ballhead system, and the characteristics of the rubber material are correlated in accordance with known laws so as to provide the desired ratio of natural to forcing frequency.

If desired, the damping effect may be increased by enlarging the areas of the coacting opposed surfaces which are immersed in the liquid body 43. This may be accomplished by forming additional pairs of coacting surfaces 40 and 41 on the speed responsive device and drive member. Such surfaces may, as shown in Fig. 4 for example, be the opposed inner and outer peripheries of a plurality of annular ribs 50 and 51 respectively formed on the bottom of the ballhead 24 and the disk 26. These ribs are spaced as close together as is practicable in ordinary manufacture, for example, $\frac{1}{32}$ of an inch or less. The viscous drag produced by the coaction of the opposed surfaces and the liquid 43 resists angular displacement of the ballhead relative to the drive member 14 and is increased in proportion to the increase in the area of the opposed surfaces on the ballhead and drive member.

This application is a continuation-in-part of my copending application Serial No. 623,801, filed October 22, 1945, now abandoned.

I claim as my invention:

1. A governor comprising a rotary drive sleeve, a cup rigid with one end of said sleeve and adapted to contain lubricating fluid, a head carrying flyballs projecting through the bottom of said cup and supported by a bearing in the cup for angular displacement about the rotational axis of the cup, a coupling providing an angularly yieldable drive connection between said sleeve and said ballhead permitting of relative angular displacement between the ballhead and said cup, said ballhead having thereon a radially facing peripheral surface rotatable with the ballhead, and a surface concentric with and disposed closely adjacent to said peripheral surface and rotatable with said cup, said surfaces coacting with the fluid therebetween to produce a damping action in response to relative displacement between the ball head and cup.

2. A governor comprising a rotary drive member, a container rotatable therewith and adapted to contain a fluid, a rotary speed responsive device disposed within said container to be immersed in said fluid, a coupling of resilient material providing an angularly yieldable drive connection between said device and said drive member so as to permit of angular displacement of said device relative to said container and said member in response to sudden changes in the speed of said drive member, and opposed concentric surfaces respectively rotatable with said container and said device and disposed within said fluid and closely spaced so as to impose a viscous drag on said device for damping the oscillations thereof.

3. A governor comprising a rotary drive member, a rotary speed responsive device, means providing a resilient torque transmitting connection between said drive member and said device yieldable angularly in response to instantaneous variations in the speed of said member whereby to produce relative angular displacement between said drive member and said device, means providing an annular surface rotatable with said device, a receptacle rotatable in unison with said drive member and containing a fluid immersing said surface, and a second annular surface rotatable in unison with said receptacle and spaced close to and opposing said first surface so as to be immersed in said fluid and coact with said first surface to produce a viscous drag resisting said angular displacement.

4. A governor comprising a rotary drive member, a rotary speed responsive device, a coupling providing a resilient torque transmitting connection between said drive member and said device angularly yieldable in response to instantaneous speed changes of said member, a container rotatable with said drive member and angularly displaceable relative to said device by yielding of said coupling, said container being adapted to contain a fluid, and opposed surfaces immersed in the fluid in said container and rotatable with said drive member and device respectively, said surfaces being closely spaced and coacting with the liquid to impose a viscous fluid drag resisting angular displacement of said device relative to said member.

5. A governor comprising a rotary drive member, a rotary speed responsive device, means providing a resilient torque transmitting connection between said drive member and said device yieldable angularly in response to instantaneous variations in the speed of said member so as to permit relative angular displacement between said member and device in response to instantaneous variations in the speed of said drive member, a liquid receptacle rotatable with said drive member and containing a body of liquid submerging said speed responsive device, and opposed surfaces immersed in said liquid respectively rotatable with said drive member and said speed responsive device and coacting with the liquid between them to impose a damping action opposing relative angular displacement between said member and said device, said surfaces being disposed below the level of said liquid.

6. In a speed responsive governor, mechanism for damping the forced oscillations of a flyball system comprising a peripheral surface rotatable with the flyball of said system, a rotatable cup, means providing a resilient connection between said cup and said flyball system to permit relative angular displacement of said cup and said system in response to instantaneous speed variations, said cup being adapted to contain fluid immersing said peripheral surface, and an annular surface on said cup concentric with said first-mentioned surface and disposed closely adjacent but spaced from the latter so as to impose a viscous fluid drag on said flyball system.

7. A governor comprising a rotary drive member, a cup adapted to contain a body of liquid and having a peripheral wall concentric with the axis of said member and a bottom wall rigidly secured to the member, a ballhead disposed within said cup so as to be immersed in the liquid therein, a bearing mounted in said bottom wall and supporting said ballhead for rotation about the axis of said peripheral wall, means providing a resilient drive connection between said drive member and said ballhead angularly yieldable to produce relative angular displacement between said cup and ballhead in response to instantaneous changes in the speed of said member, flyballs mounted on said ballhead for radial movement in response to changes in the speed of rotation thereof, and surfaces rotatable with said ballhead and said cup respectively and coacting with the liquid therebetween to impose a damping action opposing relative angular displacement between said member and said ballhead.

8. A governor comprising a rotary drive member, a cup adapted to contain a body of liquid and having a peripheral wall concentric with the axis of said member and a bottom wall rigidly secured to the member, a ballhead disposed within said cup so as to be immersed in the liquid therein, means rotatably supporting said ballhead in said bottom wall for rotation relative thereto about the axis of said peripheral wall, means providing a resilient drive connection between said drive member and said ballhead angularly yieldable to produce relative angular displacement between said cup and ballhead in response to instantaneous changes in the speed of said member, flyballs mounted on said ballhead for radial movement in response to changes in the speed of rotation thereof, and means for imposing a damping action opposing relative angular displacement between said member and said ballhead including an arcuate surface concentric with the ballhead axis and rotatable with the ballhead, said last mentioned surface being disposed close to the interior of said peripheral wall and forming a narrow arcuate gap filled with said liquid.

GEORGE E. SORENSEN.

References Cited in the file of this patent

UNITED STATES PATENTS

| Number | Name | Date |
|---|---|---|
| 713,497 | Rowland | Nov. 11, 1902 |
| 1,087,818 | Osborne | Feb. 17, 1914 |
| 1,240,739 | Lemp | Sept. 18, 1917 |
| 1,996,104 | Forte | Apr. 2, 1935 |
| 2,229,681 | Sorensen | Jan. 28, 1941 |
| 2,307,506 | Huntington | Jan. 5, 1943 |